(12) United States Patent
Hwang et al.

(10) Patent No.: US 12,015,285 B2
(45) Date of Patent: Jun. 18, 2024

(54) CONNECTING APPARATUS FOR ELECTRONIC DEVICE AND CONTROLLING METHOD THEREOF

(71) Applicants: Hyundai Motor Company, Seoul (KR); Kia Corporation, Seoul (KR)

(72) Inventors: Seung Hai Hwang, Gyeonggi-do (KR); Kyowoong Choo, Seoul (KR); Soon Kwon Paik, Gyeonggi-do (KR); Nam Kwon Jung, Gyeonggi-do (KR); Keun Ho Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 50 days.

(21) Appl. No.: 17/993,447

(22) Filed: Nov. 23, 2022

(65) Prior Publication Data
US 2023/0299593 A1    Sep. 21, 2023

(30) Foreign Application Priority Data
Mar. 21, 2022 (KR) .................. 10-2022-0034836

(51) Int. Cl.
*H02J 7/00* (2006.01)
*H01R 13/73* (2006.01)

(52) U.S. Cl.
CPC .......... *H02J 7/00034* (2020.01); *H01R 13/73* (2013.01); *H01R 2201/26* (2013.01)

(58) Field of Classification Search
CPC ........ H92J 7/00; H92J 7/00034; H01R 13/73; H01R 2201/26
See application file for complete search history.

(56) References Cited

FOREIGN PATENT DOCUMENTS

CN          201018481 Y  *  2/2008

* cited by examiner

*Primary Examiner* — Robert L Deberadinis
(74) *Attorney, Agent, or Firm* — Fox Rothschild LLP

(57) ABSTRACT

An electronic device connection apparatus and a control method thereof is disclosed. The electronic device connection apparatus may include a connector connected to an electronic device, an input device that generates, in response to a user input, a mode change signal instructing a change of an operation mode for determining a charging and/or a data transmission operation of the electronic device. The apparatus may include a controller that charges the electronic device connected to the connector and/or performs a data communication with the electronic device in response to a preset operation mode, and changes the operation mode in response to the mode change signal.

20 Claims, 16 Drawing Sheets

CONNECTING APPARATUS FOR ELECTRONIC DEVICE AND CONTROLLING METHOD THEREOF

CROSS-REFERENCE TO RELATED APPLICATION

This application claims 35 U.S.C. § 119(a) the benefit of and priority to Korean Patent Application No. 10-2022-0034836, filed in the Korean Intellectual Property Office on Mar. 21, 2022, the entire contents of which are incorporated herein by reference.

FIELD

The present disclosure relates to an electronic device connection apparatus and a control method thereof, and more particularly, relates to an electronic device connection apparatus capable of performing a complex function through a simplified configuration and a control method thereof.

BACKGROUND

With the development of electronic devices and communication, various multimedia devices are being combined in a vehicle. Accordingly, the vehicle is becoming a space that can provide various multimedia in addition to the function as a means of transportation.

Recently, a method of reproducing a sound source stored in a storage device or a portable multimedia device through a speaker of a vehicle is widely used. The storage device or the portable multimedia device may be connected to the vehicle through short-range wireless communication or a multimedia connection terminal. For the multimedia connection terminal, a Universal Serial Bus (USB) interface is mainly used.

Since USB devices have many advantages, such as superior plug and play characteristics, high speed, standardized connectors, portability, and support for related external devices, as soon as the device is connected, automatic recognition is possible, when the vehicle is equipped with a USB host and only a device driver connected to a digital camera, or the like is provided. Also, the USB device may charge a portable terminal of a user by using a power source of the vehicle.

The vehicle is equipped with USB ports for connecting a USB cable, and each USB port supports only one function. For example, a USB port for music playback has only a music file playback function, and a USB port for charging may only support a charging terminal. In addition, the USB port for the black box has only an image identification function of the black box.

Accordingly, since the number of USB ports increases to gradually use various multimedia electronic devices, manufacturing cost increases and the area occupied by the USB ports is inevitably increased.

SUMMARY

The present disclosure has been made to address the above-mentioned discussion.

An aspect of the present disclosure provides an electronic device connection apparatus capable of reducing an area occupied by USB ports.

In addition, an aspect of the present disclosure provides an electronic device connection apparatus capable of supporting various electronic devices while reducing a volume.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an electronic device connection apparatus includes a connector connected to an electronic device, an input device that generates, in response to a user input, a mode change signal instructing to change an operation mode for determining a charging or a data transmission operation of the electronic device, and a controller that charges the electronic device connected to the connector or performs a data communication with the electronic device in response to a preset operation mode, and that changes the operation mode in response to the mode change signal.

According to an embodiment, the electronic device connection apparatus may further include a storage device in which any one of two or more operation modes is written.

According to an embodiment, the controller may determine an initial operation mode based on the operation mode written in the storage device, based on a booting.

According to an embodiment, the controller may change the operation mode in a preset order depending on the mode change signal.

According to an embodiment, the controller may write a first operation mode determining the first operation mode in the storage device in response to the operation mode being changed to the first operation mode.

According to an embodiment, the operation mode may be one of a standard downstream port (SDP) mode, a dedicated charging port (DCP) mode, and a charging downstream, port (CDP) mode.

According to an embodiment, the controller may perform a mode switching between a normal charging mode or a fast charging mode in response to the mode change signal in the DCP mode.

According to an embodiment, the controller may perform a mode switching between a sound source data transmission mode or an image data transmission mode in response to the mode change signal in the CDP mode.

According to an embodiment, the controller may display on a display a user interface for receiving a user input of an operation mode that is changed depending on an operation change between the sound source data transmission mode or the image data transmission mode.

According to an embodiment, the input device may be implemented with a push button, and the controller may generate the mode change signal based on a pressing operation of the push button.

According to an embodiment, the electronic device connection apparatus may further include an indicator that displays an operation state of the operation mode.

According to an embodiment, the indicator may include a first indicator that displays an operation state of the CDP mode, and a second indicator that displays an operation state of the DCP mode.

According to an aspect of the present disclosure, a method of controlling an electronic device connection apparatus includes reading an operation mode, determining a charging mode or a data transmission mode of an electronic device connected to a connector in response to the operation mode, and changing the operation mode in response to a user input from an input device.

According to an embodiment, the reading of the operation mode may include reading, by a controller, the operation mode written to a storage device, based on a booting.

According to an embodiment, the changing of the operation mode may include generating a mode change signal in response to the user input, and changing the operation mode in a preset order in response to the mode change signal.

According to an embodiment, the changing of the operation mode may further include writing a first operation mode in a storage device in response to the operation mode being changed to the first operation mode.

According to an embodiment, the changing of the operation mode may include selecting one of a standard downstream port (SDP) mode, a dedicated charging port (DCP) mode, and a charging downstream port (CDP) mode.

According to an embodiment, the changing of the operation mode may include performing a mode switching between a normal charging mode or a fast charging mode in response to the mode change signal in the DCP mode.

According to an embodiment, the changing of the operation mode may include performing a mode switching between a sound source data transmission mode or an image data transmission mode in response to the mode change signal in the CDP mode.

According to an embodiment, the changing of the operation mode may further include displaying on a display a user interface for receiving a user input of an operation mode that is changed depending on the mode switching between the sound source data transmission mode or the image data transmission mode.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
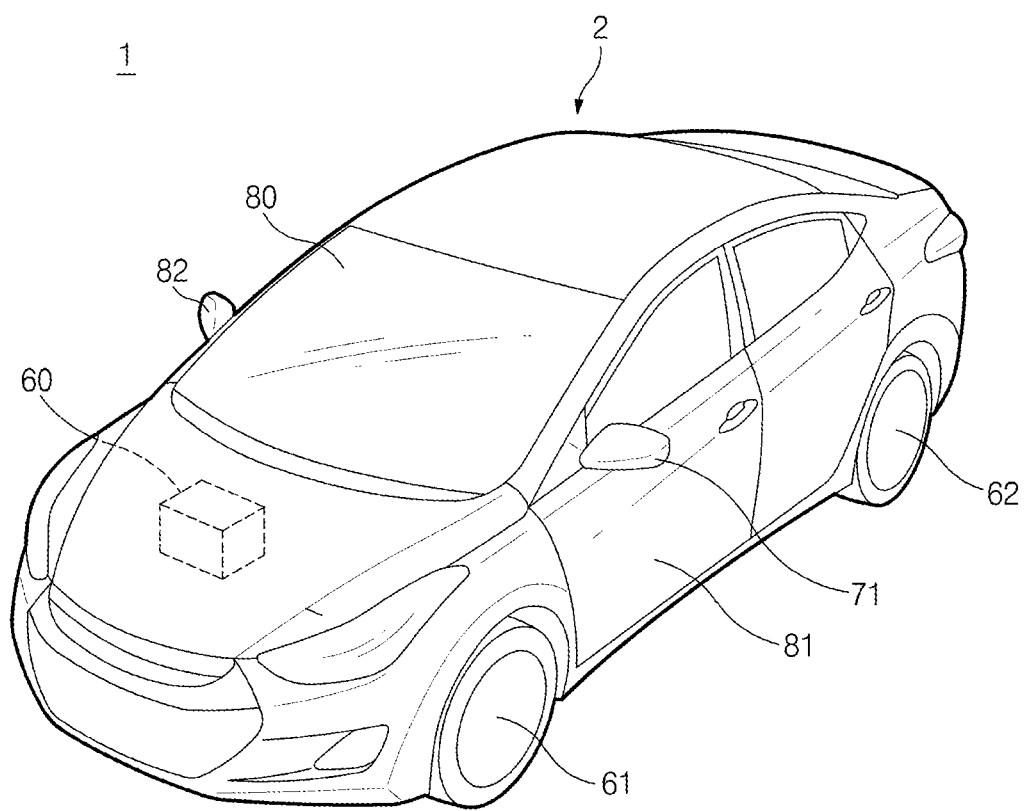
FIG. 1 is a diagram illustrating a vehicle including an electronic device connection apparatus, according to an embodiment of the present disclosure.

Hereinafter, some embodiments of the present disclosure will be described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 16.

Figure 2:
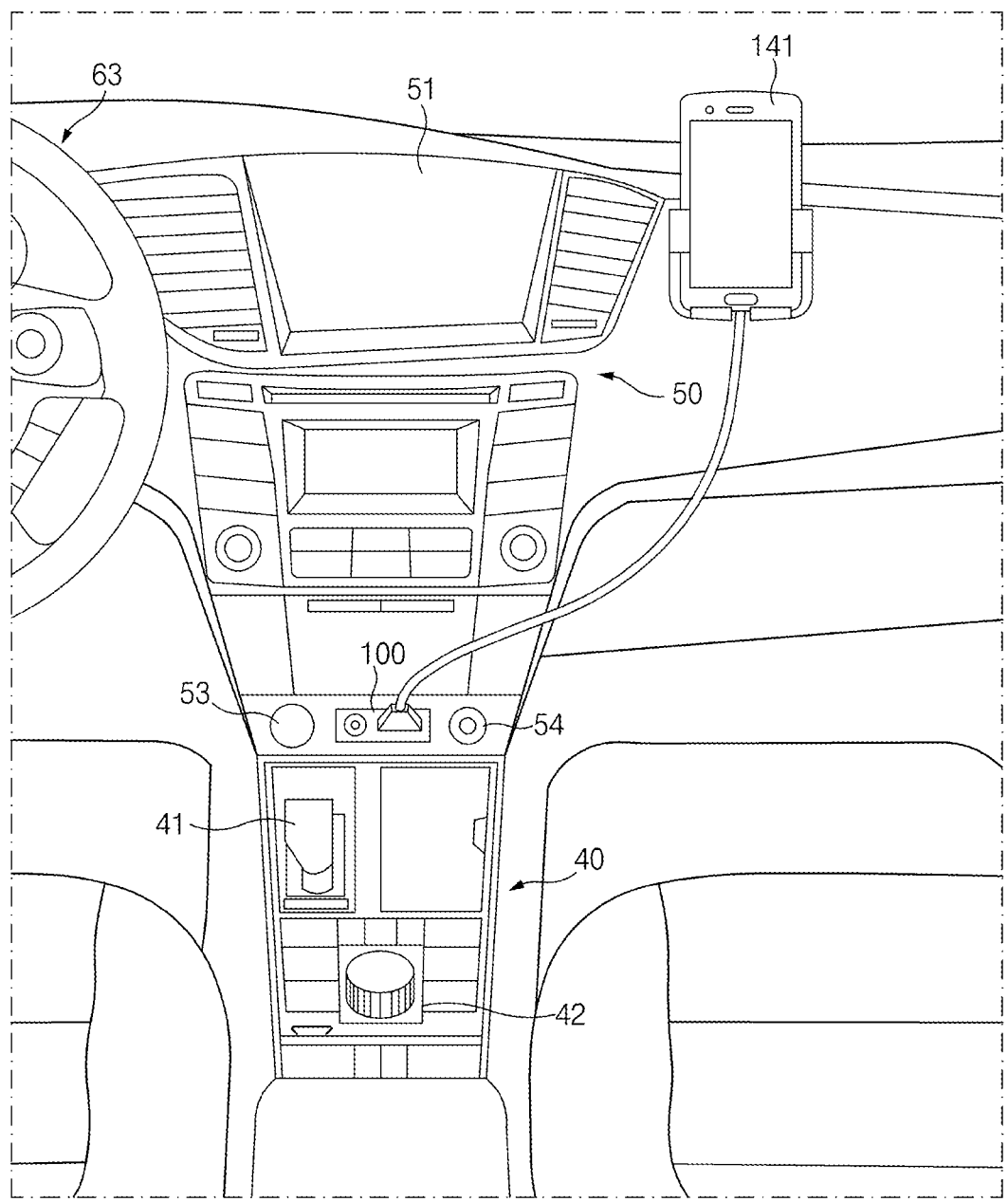
FIG. 2 is a diagram illustrating a connection between an electronic device connection apparatus and a host device, according to an embodiment of the present disclosure.

FIG. 1 is a diagram illustrating a vehicle including an electronic device connection apparatus, according to an embodiment of the present disclosure. FIG. 2 is a diagram, illustrating a connection between an electronic device connection apparatus and a host device, according to an embodiment of the present disclosure, and FIG. 3 is a diagram illustrating an electronic device connection apparatus.

Figure 3:
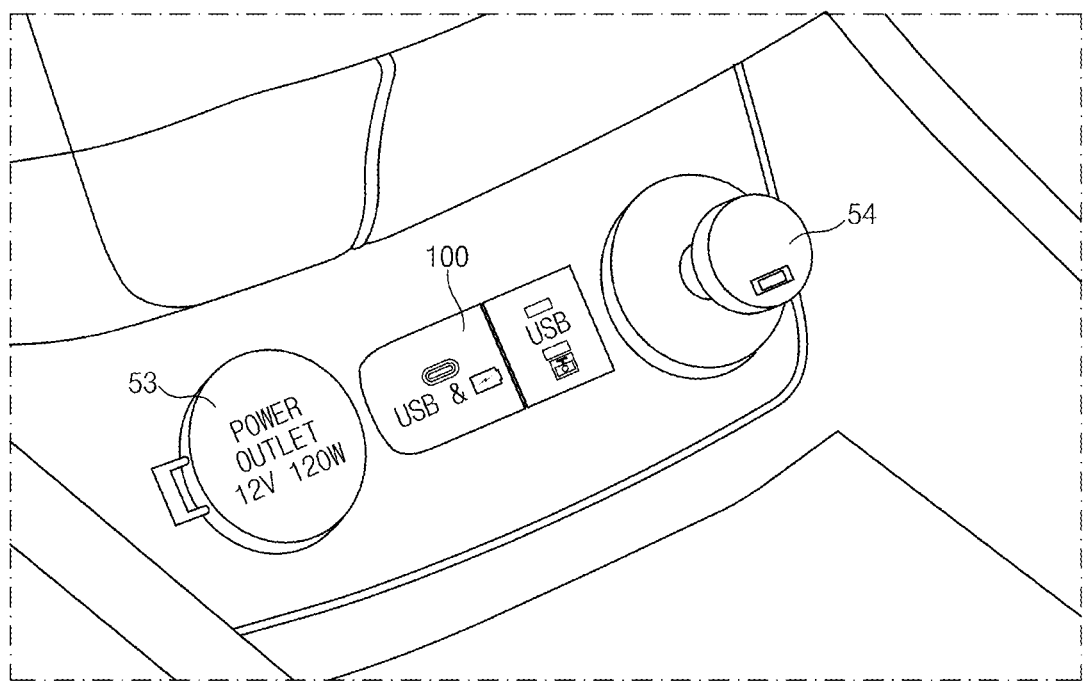
FIG. 3 is a diagram illustrating an electronic device connection apparatus.

Referring to FIGS. 1 to 3, a vehicle 1 including an electronic device connection apparatus according to an embodiment of the present disclosure may include a body 2 that forms an exterior, wheels 61 and 62 that move the vehicle 1, a driving device 60 that rotates the wheels 61 and 62, a door 71 that shields an inside of the vehicle 1 from the outside, a windshield 80 that provides a view of a front of the vehicle 1 to a user inside the vehicle 1, side mirrors 81 and 82 that provide a user with a side and rear view of the vehicle 1.

The wheels 61 and 62 may include the front wheel 61 provided at the front of the vehicle and the rear wheel 62 provided at the rear of the vehicle, and the driving device 60 may provide rotational force to the front wheel 61 or the rear wheel 62 such that the body 2 moves forward or backward. The driving device 60 may employ an engine that generates rotational force by burning fossil fuel or a motor that receives power from, a battery (not illustrated) to generate rotational force.

The door 71 is rotatably provided on the left and right sides of the body 2 such that an occupant can get on the inside of the vehicle 1 when it is opened and the inside of the vehicle 1 can be shielded from the outside when it is closed.

The windshield 80, which is a type of wind screen, may be provided on the front upper side of the body 2 to provide information about the view of the front of the vehicle 1 to a driver or user inside the vehicle 1.

The side mirrors 81 and 82 may include the left side mirror 81 provided on the left side of the body 2 and the right side mirror 82 provided on the right side of the body 2, and may provide the driver inside the vehicle 1 with side and rear view information of the vehicle 1.

As in FIGS. 2 and 3, the vehicle 1 may include a dashboard on which a gearbox 40, a center fascia 50, and a steering wheel 63 are provided.

The gearbox 40 may include a shift gear 41 for shifting the vehicle. In addition, the gearbox 40 may provide a space in which a dial manipulator 42 is installed, and the user may control a display 51 or main functions of the vehicle through the dial manipulator 42.

The center fascia 50 may include an air outlet, a clock, and a display 51.

The air outlet may control a temperature, humidity, and cleanliness of the air inside the vehicle by transmitting a flow of air controlled by the air conditioner to the inside of the vehicle. The center fascia 50 may include a button or a dial for controlling the air conditioner.

The display 51 of the center fascia 50 may display various images output by an AVN (Audio Video Navigation) device of the vehicle. The display 51 may be implemented with a liquid crystal display (LCD) panel, an organic light emitting diode (OLED) panel, or the like.

The steering wheel 63 may control the wheels 61 and 62 and further adjust the driving direction of the vehicle 1.

According to an embodiment, the dashboard may further include various instrument panels capable of displaying the driving speed, the engine rotation speed, or the remaining fuel amount of the vehicle, and a glove box capable of accommodating various objects.

In addition, a electronic device connection apparatus 100 for connecting a storage medium connection apparatus to the AVN device of the vehicle 1 and the like may be installed in the center fascia 50 of the dashboard.

The AVN device refers to a terminal capable of providing a navigation function that provides a route to a destination to a user and also providing an audio and video functions in an integrated manner. The AVN device may not only selectively display at least one of an audio screen, a video screen, and a navigation screen through the display 51, may but also display various control screens related to control of the vehicle 1 or screens related to additional functions that can be executed in the AVN device.

The AVN device may be connected to a storage medium connection apparatus through the electronic device connection apparatus 100. The storage medium may include a portable storage medium such as a USB memory, a memory card (smart media card: SMC), a CF (Compact Flash) card, a memory stick, a SD (Secure Digital) card, a multimedia card (MMC), and the like. In addition, the storage medium connectable to the connection apparatus may include a magnetic storage medium (e.g., a ROM, a floppy disk, a hard disk, or the like), an optically readable medium (e.g., a CD-ROM, a DVD, or the like), and an electronic device connected to the above-mentioned portable storage medium. In this case, the electronic device may include a magnetic storage medium, an optical reading medium, and a computer, a notebook computer, a digital camera, a smart phone, an MP3 player, a PMP (Portable Multimedia Player), a game console, and the like that can be connected to the portable storage medium.

An electronic device connection apparatus 100 for a vehicle may connect an external device such as a user terminal 141 to the vehicle. The electronic device connection apparatus 100 for a vehicle according to an embodiment of the present disclosure may use a Universal Serial Bus (hereinafter referred to as a USB) standard.

The electronic device connection apparatus 100 may be located at the lower end of the center fascia 50. The user terminal 141 corresponding to a host device may be connected to the AVN device through the electronic device connection apparatus 100 through a cable. That is, various media files stored in the user terminal 141 may be transmitted to a AVN device through the cable connected to the electronic device connection apparatus 100. In this case, the user terminal 141 becomes a host device, and the AVN device becomes a slave device.

A power supply terminal 53 or a cigarette lighter terminal 54 may be installed around the electronic device connection apparatus 100.

Figure 4:
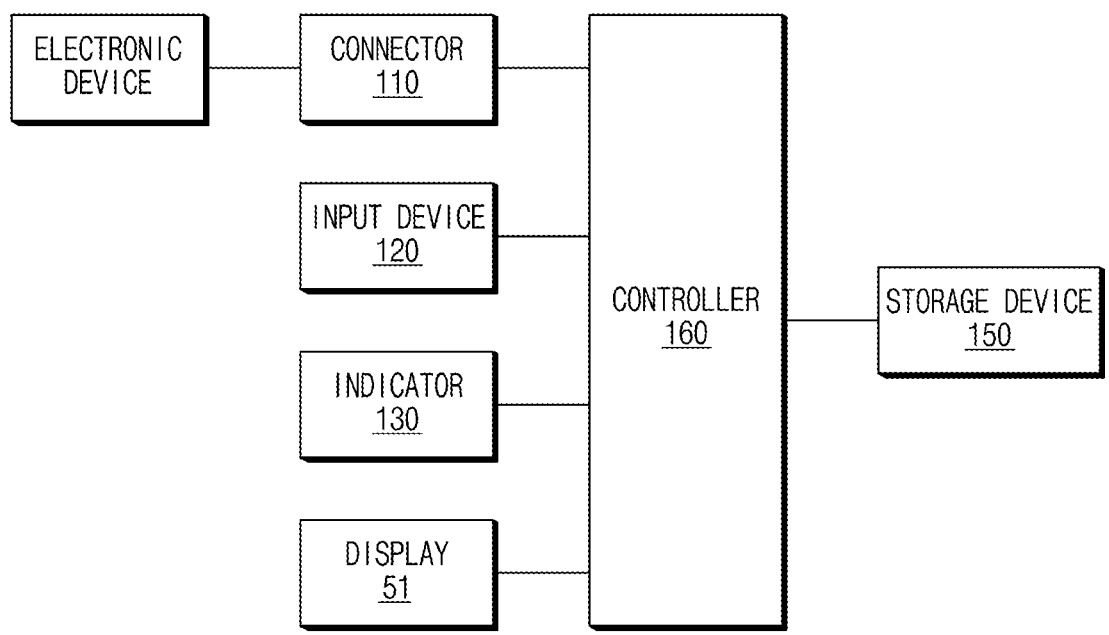
FIG. 4 is a block diagram illustrating a configuration of an electronic device connection apparatus, according to an embodiment of the present disclosure.
Figure 5:
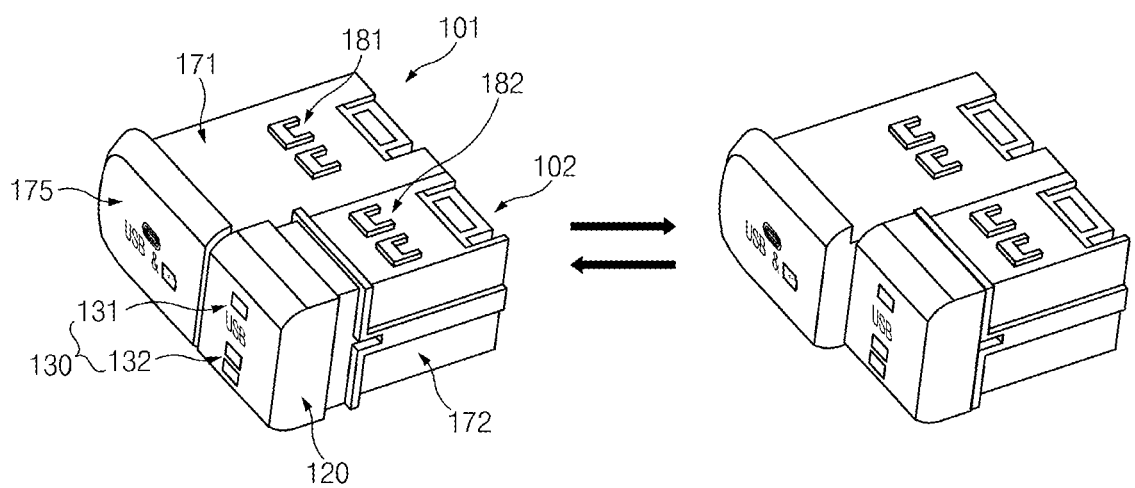
FIG. 5 is a perspective view of an electronic device connection apparatus, according to an embodiment of the present disclosure.

FIG. 4 is a block diagram, illustrating a configuration of an electronic device connection apparatus, according to an embodiment of the present disclosure, and FIG. 5 is a perspective view of an electronic device connection apparatus, according to an embodiment of the present disclosure. Referring to FIGS. 4 and 5, an electronic device connection apparatus according to an embodiment of the present disclosure is as follows.

As illustrated in FIG. 4, an electronic device connection apparatus according to an embodiment of the present disclosure may include a connector 110, an input device 120, an indicator 130, the display 51, a storage device 150, and a controller 160.

According to an embodiment, as illustrated in FIG. 5, the connector 110 may be formed in a first housing 101, and the input device 120 and the indicator 130 may be formed in a second housing 102. The display 51 may be formed on the center fascia 50 as illustrated in FIG. 2.

The storage device 150 and the controller 160 may be formed in the first housing 101 or the second housing 102, or may be included in an Electronic Control Unit (ECU) of the vehicle.

The first housing 101 may include a first body portion 171 and a front portion 175.

The front portion 175 of the first housing 101 may be exposed to the outside of the vehicle, and the first body portion 171 may be inserted into the center fascia 50. The connector 110 may be exposed on the front portion 175 of the first housing 101. The connector 110 according to an embodiment may be a USE port.

On one surface of the first body portion 171, a first locking portion 181 that can be engaged with a groove formed in the center fascia 50 may be formed. The fastening means of the first housing 101 for coupling with the center fascia 50 may be implemented in various forms other than the first locking portion 181.

The second housing 102 may include a second body portion 172 and the input device 120.

The second body portion 172 of the second housing 102 may be adjacent to the first body portion 171 of the first housing 101. Alternatively, the second body portion 172 and the first body portion 171 may be formed of a single structure. Alternatively, although the embodiment of the present disclosure illustrates a form in which the second housing 102 is coupled to the first housing 101, the second housing 102 may be formed as a separate structure while being spaced apart from the first housing 101.

On one surface of the second body portion 172, a second locking portion 182 that can be engaged with a groove formed in the center fascia 50 may be formed.

The input device 120 may be implemented in the form of a push button formed in the front direction of the second housing 102. The input device 120 may be pressed by an external force, and may return to its original position by a spring or other elastic body having a restoring force. The input device 120 may generate a mode change signal based on a pressing operation by an external force, and the mode change signal may change an operation mode of the connector 110.

The connector 110 may be a USB port for connecting a USB cable. The USB cable may include a 4-pin communication configuration of D+, D−, Vbus, and GND.

The USB port may be powered from a host through the Vbus pin. On average, the maximum current that the host can supply is 500 mA, and the maximum voltage may be 5V. The GND may mean a ground line.

The D+ and D− pins refer to lines that transmit and receive data, and are driven by differential signals. Also, the D+ and D− may be formed to be longer than the Vbus line.

The indicator 130 may be formed on the input device 120 of the second housing 102. The indicator 130 may notify an operation mode state. According to an embodiment, the indicator 130 may include a first indicator 131 that displays that data transmission is in progress based on a CDP mode and a second indicator 132 that displays a charging state based on a DCP mode. FIG. 5 illustrates an embodiment in which the indicator 130 is formed in the second housing 102, but the position of the indicator 130 may not be limited thereto. For example, the indicator 130 may be formed in the first housing 101.

The electronic device connection apparatus according to an embodiment of the present disclosure may include two or more operation modes, and may control a charging mode or a data transmission mode of an electronic device connected to the connector 110, based on each operation mode.

Operation modes may be divided into a standard downstream, port (hereinafter referred to an SDP) mode, a charging downstream port (hereinafter referred to a CDP) mode, a dedicated charging port (hereinafter referred to a DCP) mode, and a drive video record system (hereafter referred to as DVRS) mode.

The SDP mode may refer to a mode in which charging can be performed while transmitting data in a standard USB port specification. In the SDP mode, the current can be supplied up to 500 mA when using USB 2.0 and the current can be supplied up to 900 mA when using USB 3.0.

The CDP mode is a standard that replaces the SDP mode, and may mean a mode that can perform the charging simultaneously with data transmission. In the CDP mode, the current can be supplied up to 1.5 A.

The DCP mode is referred to as a wall adapter operation mode and may only provide the charging function. In the DCP mode, the current can be supplied up to 1.5 A. The DCP mode may also provide the charging function even when the host is turned off.

The storage device 150 may provide a space in which mode information for determining an operation mode is stored. The mode information may store SDP mode information for determining the SDP operation mode, CDP mode information for determining the CDP operation mode, DCP mode information for determining the DCP operation mode, and DVRS mode information for determining the DVRS operation mode. Each mode information may be stored in the storage device 150 in the form illustrated in Table 1 below.

TABLE 1

| MODE INFORMATION | OPERATION MODE |
| --- | --- |
| 0 × CD | CDP mode |
| 0 × DC | DCP mode |
| 0 × DD | DVRS mode |

When there is an error in the mode information written in the storage device 150 or an error occurs while the controller 160 reads the mode information, the controller 160 may set the operation mode to a preset mode. For example, the controller 160 may perform the CDP operation mode in response to the occurrence of an error.

The storage device 150 may be provided in the controller 160 or may be formed of a separate memory. Accordingly, the storage device 150 may be formed of a combination of a nonvolatile memory such as a hard disk drive, a flash memory, an electrically erasable programmable read-only memory (EEPROM), a ferro-electric PAM (FRAM), a phase-change RAM (PRAM), a magnetic RAM (MRAM), or the like and/or a volatile memory such as a Dynamic Random Access Memory (DRAM), a static PAM (SRAM), a Synchronous Dynamic Random Access Memory (SDRAM), a Double Date Rate-SDRAM (DDR-SDRAM), or the like.

The controller 160 may charge the electronic device connected to the connector 110 or perform data communication with the electronic device in response to a preset operation mode. In addition, the controller 160 may change an operation mode in response to the mode change signal.

According to an embodiment, the controller 160 may read the operation mode written in the storage device 150 based on the booting so as to determine an initial operation mode to operate at the time of the booting.

According to an embodiment, after the initial operation mode, the controller 160 may change the operation mode in a preset order depending on the mode change signal.

According to an embodiment, when the operation mode is changed to an arbitrary first operation mode, the controller 160 may write the first operation mode to the storage device.

According to an embodiment, the controller may be configured to determine a most frequent operation mode based on historical usage of the input device. Similarly, the controller may be configured to rank the various historical operation modes sequentially and write the ranking of operation modes to the storage device. For example, the controller may establish and write a first preset, a second preset, a third preset, etc. of the preset order to the storage device based on the most frequent operation mode.

Figure 6:
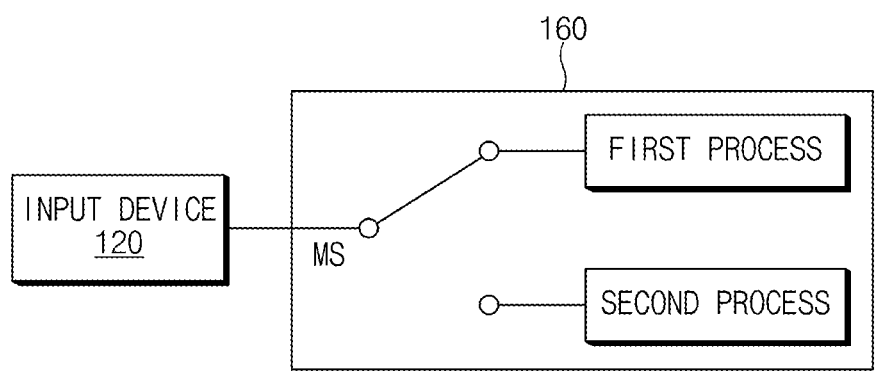
FIG. 6 is a diagram for describing a mode change of a controller, according to an embodiment of the present disclosure.

FIG. 6 is a diagram for describing a mode change of a controller, according to an embodiment of the present disclosure.

Referring to FIG. 6, the controller 160 may generate a mode change signal MS based on a pressing operation of the input device 120. The controller 160 may perform a switching operation between a first process and a second process depending on the mode change signal MS. Each of the first and second processes may be algorithm for performing a preset operation mode. That is, the controller 160 may select a specific process based on the mode change signal MS to perform an operation mode.

According to an embodiment, in the process of performing the CDP operation mode, the controller 160 may preferentially attempt data protocol matching. After the data communication connection with the electronic device connected to the connector 110 is completed, the controller 160 may set a maximum charging current that can be provided to the electronic device to be matched with each other.

Also, according to an embodiment, in the process of performing the DCP operation mode, the controller 160 may match the electronic device connected to the connector 110 for charging only. In the DCP operation mode, the controller 160 may identify the maximum power that the electronic device can receive, and may match the communication protocol to provide the maximum, power to the electronic device.

Figure 7:
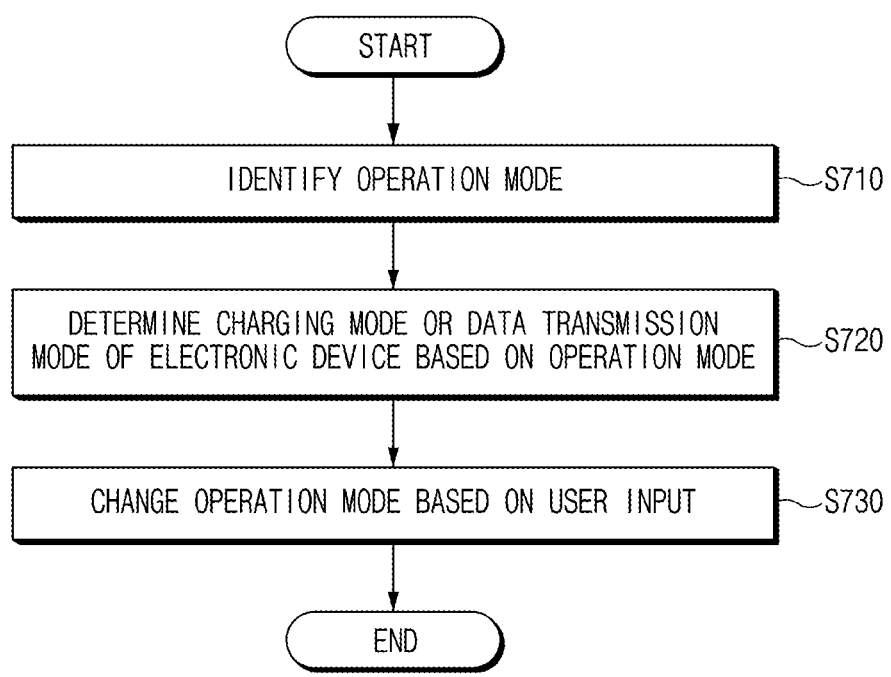
FIG. 7 is a flowchart illustrating a control method of an electronic device connection apparatus, according to an embodiment of the present disclosure.

FIG. 7 is a flowchart illustrating a control method of an electronic device connection apparatus, according to an embodiment of the present disclosure.

With reference to FIGS. 4 to 7, a control method of an electronic device connection apparatus according to an embodiment of the present disclosure will be described as follows.

In S710, the controller 160 may identify an operation mode. To this end, the controller 160 may read the operation mode written in the storage device 150.

In S720, the controller 160 may determine a charging mode or a data transmission mode of the electronic device based on the operation mode.

The operation mode determines the charging mode or the data transmission mode of the electronic device, and according to an embodiment, the operation modes may include the SDP mode, the DCP mode, and the CDP mode.

In S730, the controller 160 may change the operation mode based on a user input.

The user input may be identified through the input device 120. Whenever there is a pressing operation of the push button type input device 120, the controller 160 may generate the mode change signal. In addition, the controller 160 may change an operation mode in response to the mode change signal.

The order of changing the operation mode may be preset.

According to an embodiment, the controller 160 may change the operation mode such that each operation mode proceeds sequentially. For example, when the operation mode includes a first to third operation modes, the controller 160 may change the operation mode in the order of the first operation mode, the second operation mode, the third operation mode, and the first operation mode, in response to the mode change signal.

According to an embodiment, the controller 160 may perform mode switching between the charging mode and the fast charging mode in response to the mode change signal. For example, when the mode change signal is generated while operating in the charging mode, the controller 160 may perform mode switching to the fast charging mode.

According to an embodiment, the controller 160 may perform mode switching between the sound source data transmission mode or the image data transmission mode in response to the mode change signal. For example, when the mode change signal is generated while operating in the sound source data transmission mode, the controller 160 may switch the operation mode to the image data transmission mode.

Figure 8:
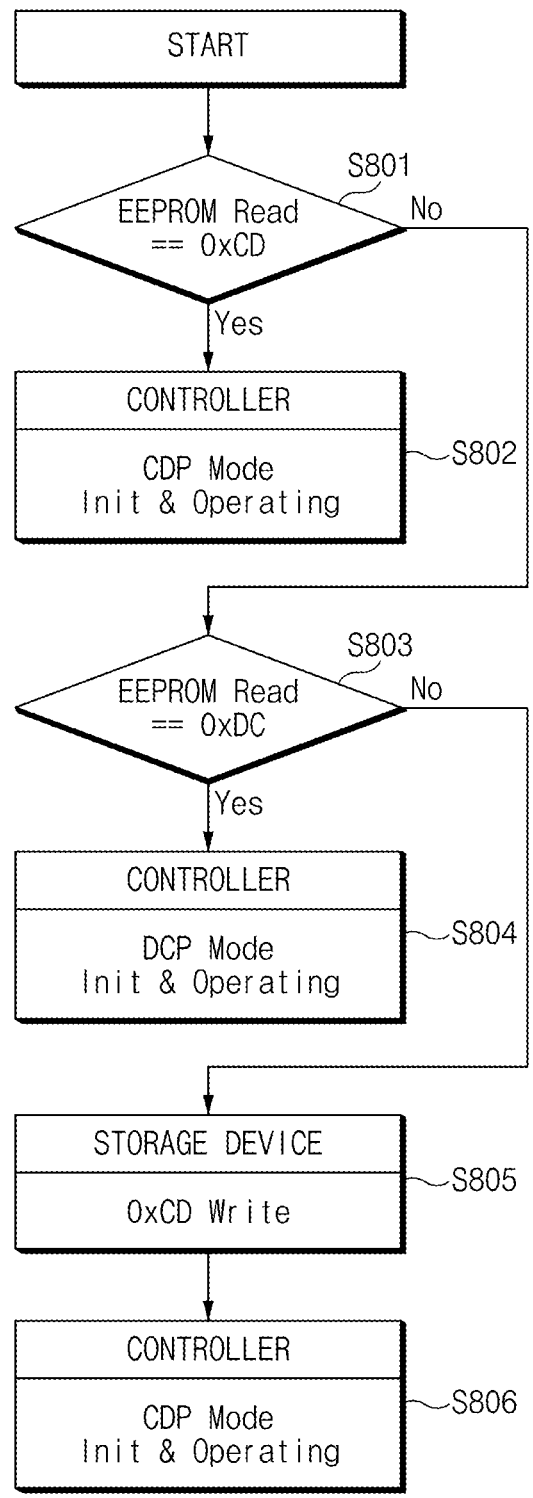
FIG. 8 is a diagram for describing a booting sequence of an electronic device connection apparatus, according to an embodiment of the present disclosure.

FIG. 8 is a diagram for describing a booting sequence of an electronic device connection apparatus, according to an embodiment of the present disclosure. Referring to FIG. 8, the booting sequence of the electronic device connection apparatus according to an embodiment of the present disclosure is as follows.

In S801, the controller 160 may read mode information from the storage device 150. Then, the controller 160 may determine whether the mode information stored in the storage device 150 is CDP mode information.

In S802, the controller 160 may initialize the CDP mode based on the information stored in the storage device 150 being the CDP mode information. In addition, the controller 160 may perform the CDP mode operation. That is, the controller 160 may charge the electronic device connected to the connector 110 and receive data from the electronic device, based on the CDP operation mode.

In S803, the controller 160 may read the mode information of the storage device 150 based on the fact that the information stored in the storage device 150 is not the CDP mode information. Then, the controller 160 may determine whether the mode information stored in the storage device 150 is DCP mode information.

In S804, the controller 160 may initialize the DCP mode based on the information stored in the storage device 150 being the DCP mode information. In addition, the controller 160 may perform the DCP mode operation. That is, the controller 160 may charge the electronic device connected to the connector 110 in the normal charging mode or in the fast charging mode, based on the DCP operation mode.

Based on that the information stored in the storage device 150 is not the DCP mode information in S803, the controller 160 may write CDP mode information in the storage device 150 in S805. Then, in S806, the controller 160 may initialize the CDP mode and perform the CDP mode operation.

Figure 9:
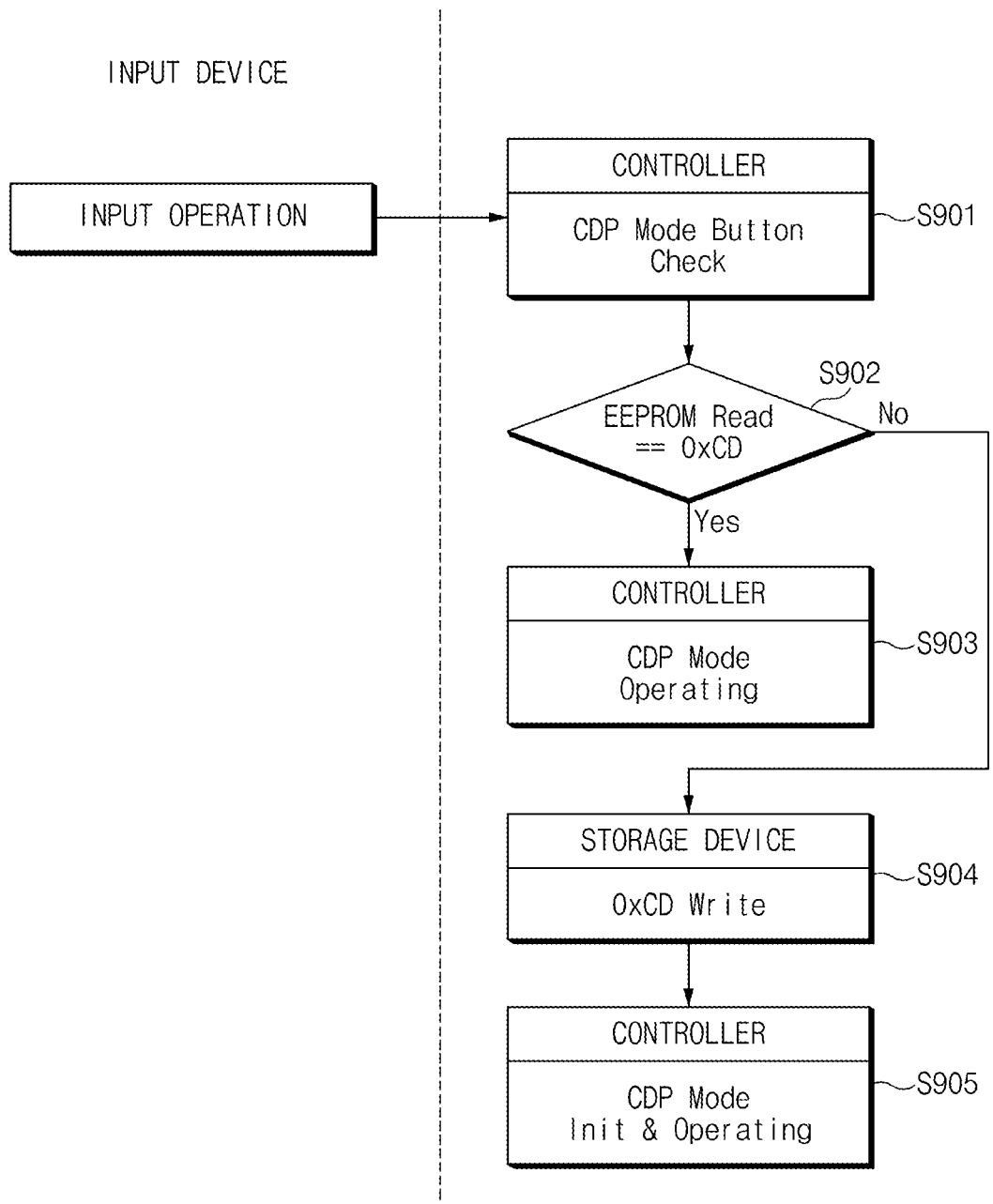
FIG. 9 is a flowchart for describing a control method of an electronic device connection apparatus, according to a first embodiment of the present disclosure.

FIG. 9 is a flowchart illustrating a control method of an electronic device connection apparatus, according to a first embodiment of the present disclosure. A first embodiment illustrated in FIG. 9 describes a procedure for changing to a CDP operation mode by a mode change signal.

Referring to FIG. 9, the control method of the electronic device connection apparatus according to the first embodiment of the present disclosure may be initiated based on the generation of the mode change signal in S901. The mode change signal may be generated by an operation of the input device 120. A procedure for changing to the CDP operation mode by the mode change signal may be determined based on a preset mode change order. For example, when the CDP operation mode proceeds after any operation mode "A", the procedure illustrated in FIG. 9 may be performed based on the mode change signal generated in the operation mode "A" state.

In S902, the controller 160 may identify mode information from the storage device 150. The controller 160 may read the mode information of the storage device 150 and may determine whether the mode information is the CDP information. According to an embodiment, the controller 160 may determine whether the mode information of the storage device 150 is "0×CD".

In S903, based on that the mode information of the storage device 150 is the CDP mode information, the controller 160 may operate the CDP operation mode. For example, the controller 160 may charge the electronic device connected to the connector 110, and may receive data from the electronic device.

In S904, when the mode information of the storage device 150 is not the CDP mode information, the controller 160 may write the CDP mode information in the storage device 150.

In S905, the controller 160 may prepare the process for the CDP operation mode and perform the CDP operation mode.

Figure 10:
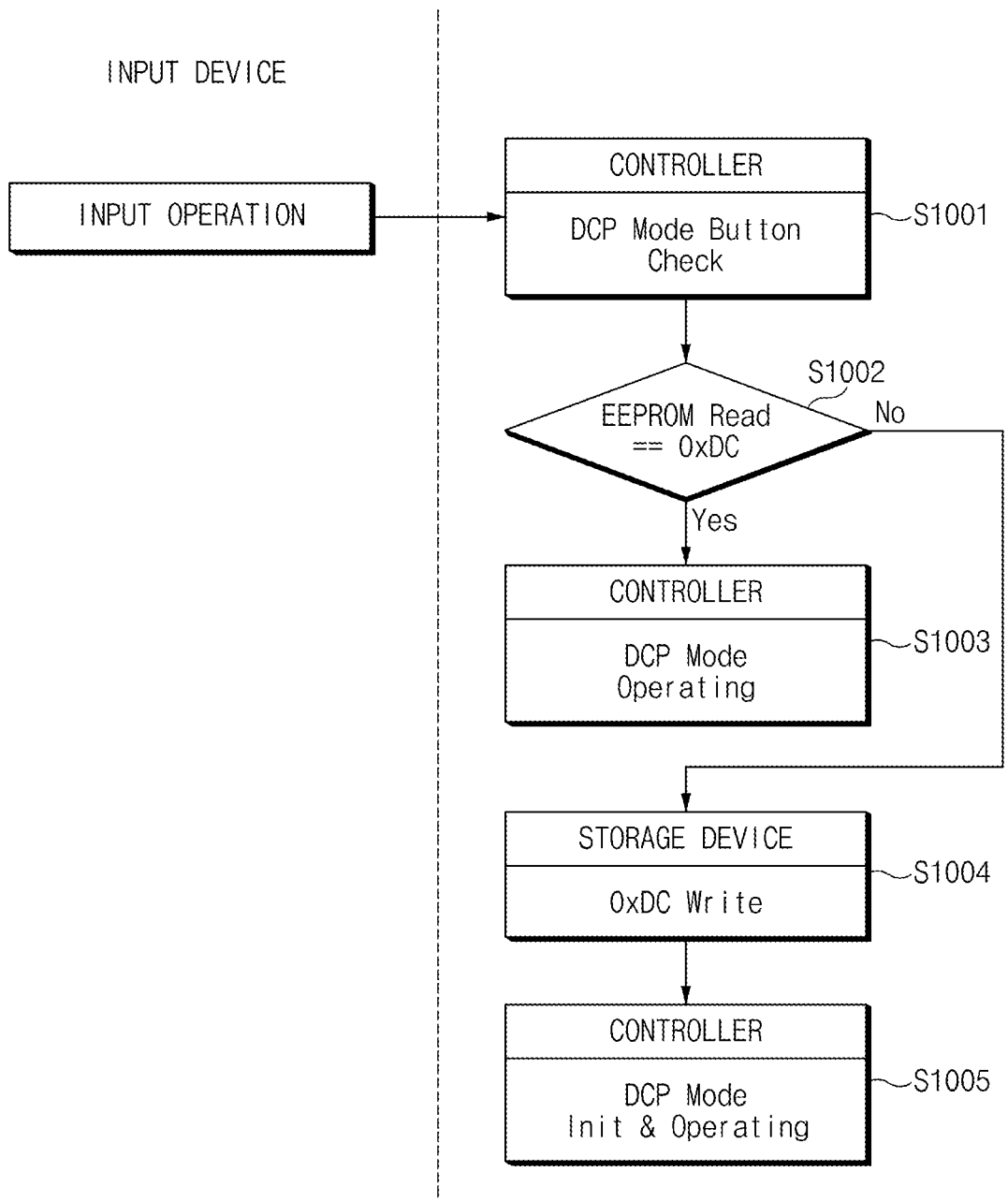
FIG. 10 is a flowchart for describing a control method of an electronic device connection apparatus, according to a second embodiment of the present disclosure.

FIG. 10 is a flowchart illustrating a control method of an electronic device connection apparatus, according to a second embodiment of the present disclosure. A second embodiment illustrated in FIG. 10 describes a procedure for changing to a DCF operation mode by a mode change signal.

Referring to FIG. 10, the control method of the electronic device connection apparatus according to the second embodiment of the present disclosure may be initiated based on the generation of the mode change signal in S1001. The mode change signal may be generated by an operation of the input device 120. A procedure for changing to the DCP operation mode by the mode change signal may be determined based on a preset mode change order. For example, when the DCP operation mode proceeds after any operation mode "B", the procedure illustrated in FIG. 10 may be performed based on the mode change signal generated in the operation mode "B" state.

In S1002, the controller 160 may identify mode information from, the storage device 150. The controller 160 may read the mode information of the storage device 150 and may determine whether the mode information is the DCP information. According to an embodiment, the controller 160 may determine whether the mode information of the storage device 150 is "0xDC".

In S1003, based on that the mode information of the storage device 150 is the DCP mode information, the controller 160 may operate the DCP operation mode. For example, the controller 160 may charge the electronic device connected to the connector 110 in the normal charging mode or in the fast charging mode.

In S1004, when the mode information of the storage device 150 is not the DCP mode information, the controller 160 may write the DCP mode information in the storage device 150.

In S1005, the controller 160 may prepare the process for the DCP operation mode and perform the DCP operation mode.

Figure 11:
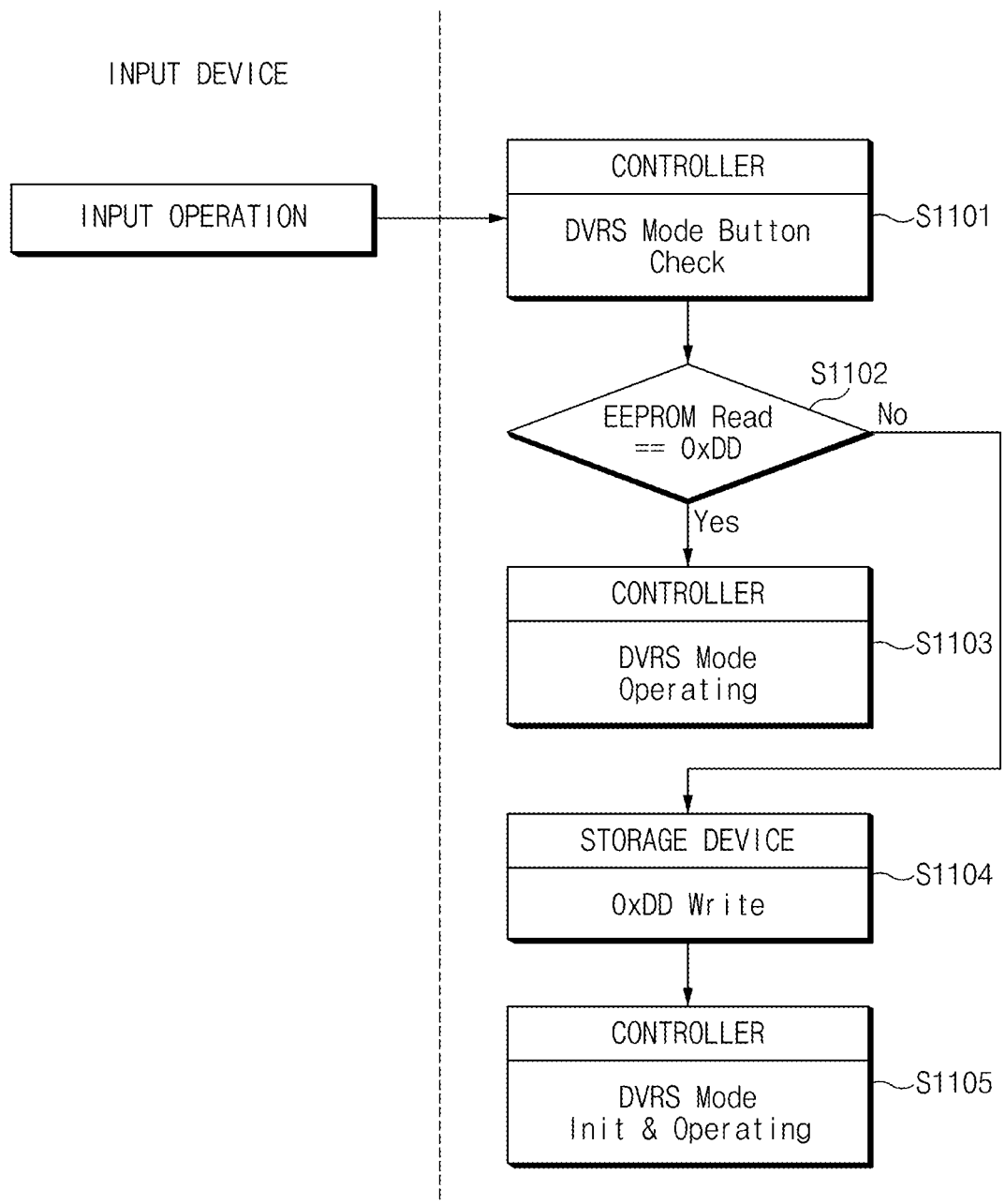
FIG. 11 is a flowchart for describing a control method of an electronic device connection apparatus, according to a third embodiment of the present disclosure.

FIG. 11 is a flowchart for describing a control method of an electronic device connection apparatus, according to a third embodiment of the present disclosure. A third embodiment illustrated in FIG. 11 describes a procedure for changing to a DVRS operation mode by a mode change signal.

Referring to FIG. 11, the control method of the electronic device connection apparatus according to the third embodiment of the present disclosure may be initiated based on the generation of the mode change signal in S1101. The mode change signal may be generated by an operation of the input device 120. A procedure for changing to the DVRS operation mode by the mode change signal may be determined based on a preset mode change order. For example, when the DVRS operation mode proceeds after any operation mode "C", the procedure illustrated in FIG. 11 may be performed based on the mode change signal generated in the operation mode "C" state.

In S1102, the controller 160 may identify mode information from the storage device 150. The controller 160 may read the mode information of the storage device 150 and may determine whether the mode information is the DVRS information. According to an embodiment, the controller 160 may determine whether the mode information of the storage device 150 is "0xDD".

In S1103, based on that the mode information of the storage device 150 is the DVRS mode information, the controller 160 may operate the DVRS operation mode. For example, the controller 160 may receive driving image data from a black box connected to the connector 110.

In S1104, when the mode information of the storage device 150 is not the DVRS mode information, the controller 160 may write the DVRS mode information in the storage device 150.

In S1105, the controller 160 may prepare the process for the DVRS operation mode and perform the DVRS operation mode.

FIGS. 12 to 15 are diagrams illustrating a display screen of a display, according to an operation mode change.

Figure 12:
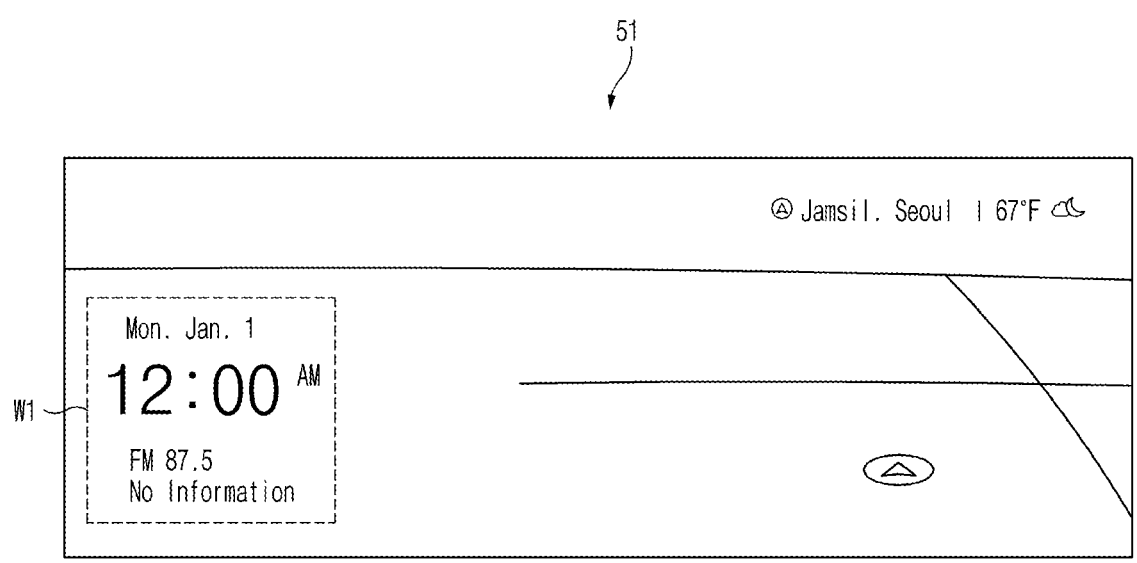
FIGS. 12 to 15 are diagrams illustrating a display screen of a display, according to an operation mode change.
Figure 13:
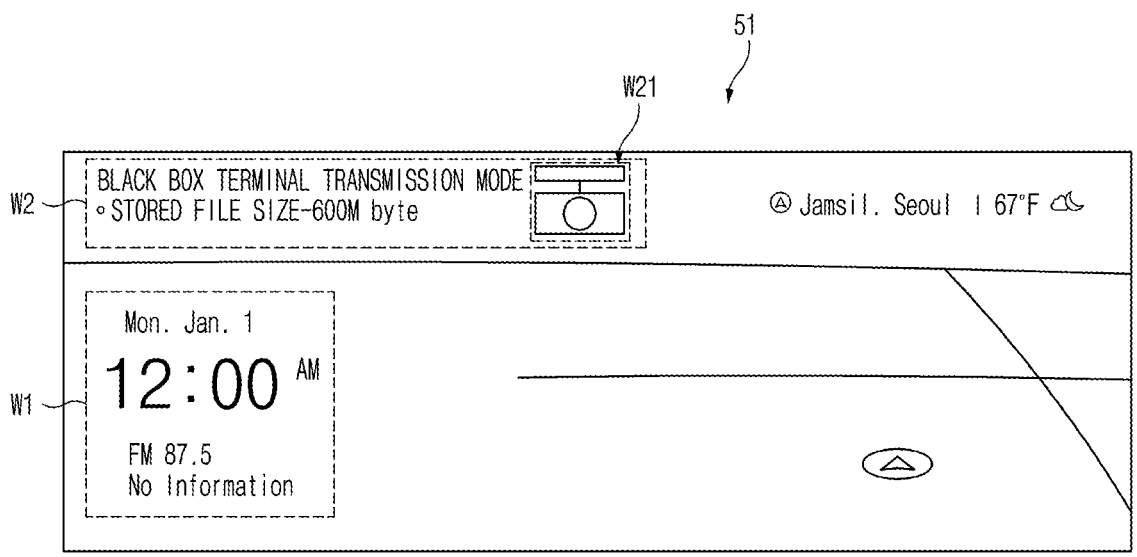

Referring to FIGS. 12 and 13, changes in a display screen of the display according to the CDP mode change are as follows.

When the electronic device connection apparatus 100 operates in the CDP operation mode, the controller 160 may receive sound source data from the electronic device connected to the connector 110. In the CDP operation mode, the display 51 may display general meta information through an additional information window W1 as illustrated in FIG. 12. The meta information may include date information, time information, broadcast information, and the like.

Also, in the CDP operation mode, the first indicator 131 of the indicator 130 of the electronic device connection apparatus 100 may maintain a light emitting state.

When a press event of the input device 120 occurs in the CDP operation mode state, the controller 160 may change the operation mode and may display the changed operation mode through a mode display window W2 of the display 51 as illustrated in FIG. 13. For example, the controller 160 may change from the sound source data transmission mode to the image data transmission mode in response to the mode change signal in the CDP mode.

Also, the controller 160 may display operation mode information and a user interface on the mode display window W2 based on the image data transmission mode being performed. The user interface displayed on the mode display window W2 may vary depending on an electronic device connected to the connector 110. For example, when a black box is connected, the user interface may display an icon W21 for transmitting an image of the black box.

Figure 14:
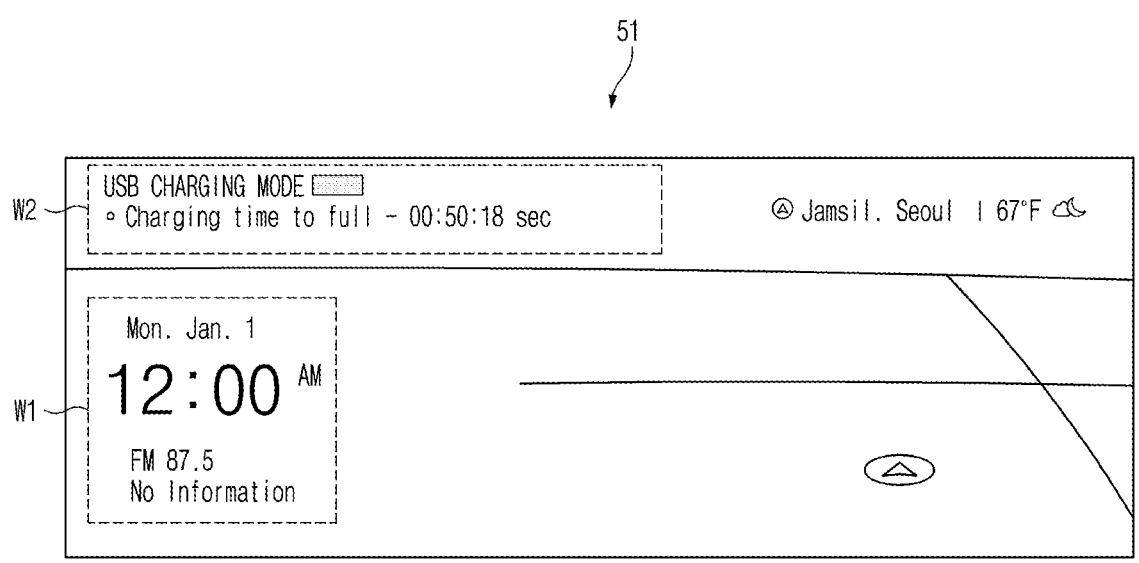
Figure 15:
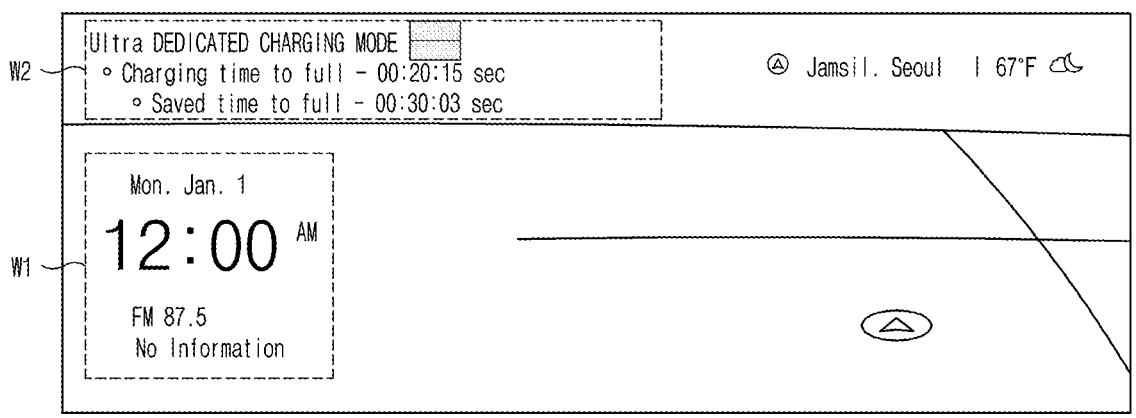

Referring to FIGS. 14 and 15, changes in a display screen of the display according to the DCP mode change are as follows.

When the electronic device connection apparatus 100 operates in the DCP operation mode, the controller 160 may charge the electronic device connected to the connector 110. The DCP operation mode may include a normal charging mode. In the normal charging mode, the display 51 may display general meta information through the additional information window W1 as illustrated in FIG. 14. The meta information may include date information, time information, broadcast information, and the like. Also, in the normal charging mode, the display 51 may display the charging mode state through the mode display window W2.

Also, in the DCP operation mode, the second indicator 132 of the indicator 130 of the electronic device connection apparatus 100 may maintain a light emitting state.

When a press event of the input device 120 occurs in the DCP operation mode state, the controller 160 may change the operation mode and may display the changed operation mode through the mode display window W2 of the display 51 as illustrated in FIG. 15. For example, the controller 160 may change from the normal charging mode to the fast charging mode in response to the mode change signal in the DCP mode. Also, the controller 160 may display operation mode information on the mode display window W2 based on the fast charging mode being performed. That is, the mode display window W2 may display the remaining charging time while displaying the operating state of the fast charging mode.

Figure 16:
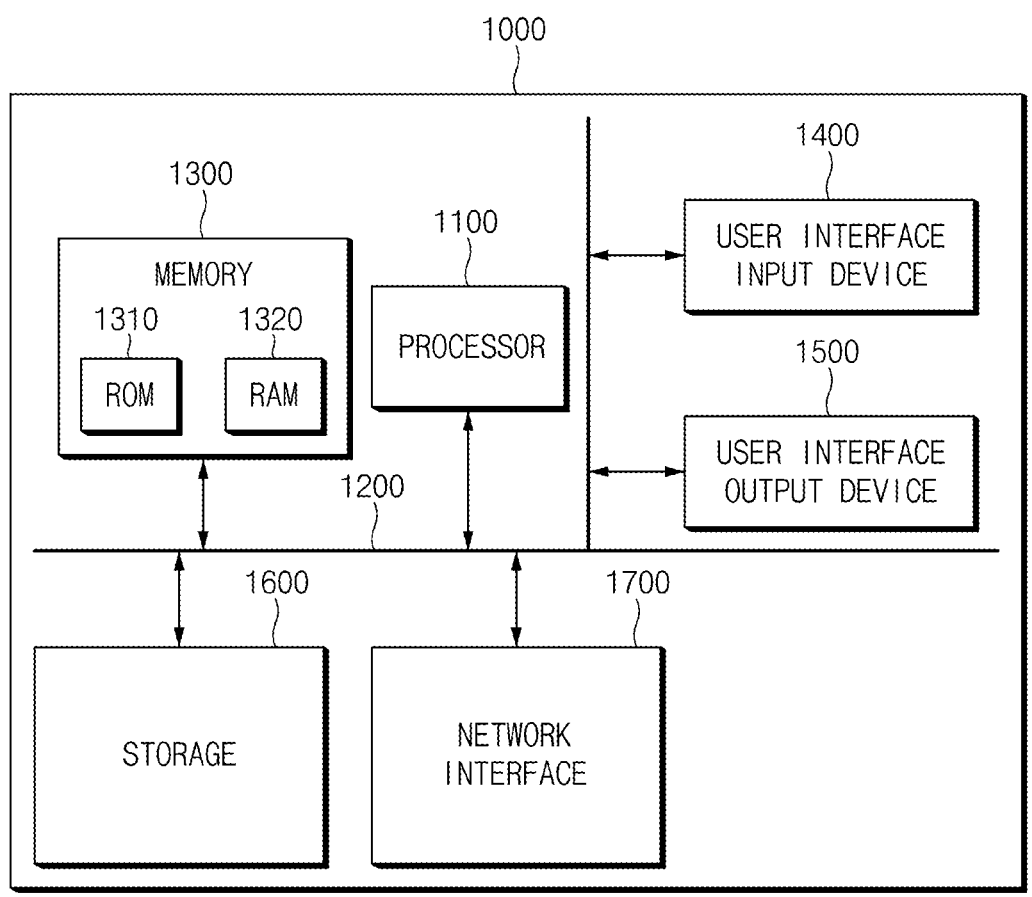
FIG. 16 is a diagram illustrating a computing system, according to an embodiment of the present disclosure.

FIG. 16 is a diagram illustrating a computing system, according to an embodiment of the present disclosure.

Referring to FIG. 16, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. In particular, the processor 1100 according to an embodiment of the present disclosure may include the controller 160 of the electronic device connection apparatus 100. Each of the memory 1300 and the storage 1600 may include various types of volatile or nonvolatile storage media. For example, the memory 1300 may include a read only memory (ROM) and a random access memory (RAM).

Accordingly, the operations of the method or algorithm, described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an embodiment of the present disclosure, since it is possible to support operation modes of various types of USB connection devices while reducing the number of USB ports, the space occupied by the USB ports may be reduced.

In addition, according to an embodiment of the present disclosure, since a plurality of USB operation modes may be supported without changing hardware, compatibility of operation modes may be improved to correspond to various electronic devices.

In addition, according to an embodiment of the present disclosure, by displaying a user interface of an operation mode, it is possible to facilitate a user input of the electronic device in response to the changed operation mode.

In addition, various effects directly or indirectly identified through this document may be provided.

The above description is merely illustrative of the technical idea of the present disclosure, and those of ordinary skill in the art to which the present disclosure pertains will be able to make various modifications and variations without departing from the essential characteristics of the present disclosure.

Therefore, embodiments of the present disclosure are not intended to limit the technical spirit of the present disclo-sure, but provided only for the illustrative purpose. The scope of protection of the present disclosure should be construed by the attached claims, and all equivalents thereof should be construed as being included within the scope of the present disclosure.

What is claimed is:

1. An electronic device connection apparatus comprising:
   a connector configured to be connected to an electronic device;
   an input device configured to generate, in response to a user input, a mode change signal, the mode change signal comprising instructions to select at least one operation mode from a plurality of operation modes,
   the plurality of operation modes comprising at least: a charging operation mode, and a data transmission operation mode; and
   a controller configured to:
   charge the electronic device according to the charging operation mode,
   communicate with the electronic device according to the data transmission operation mode,
   receive the mode change signal from the input device, and
   change between and select at least one operation mode of the plurality of operation modes in response to the mode change signal.

2. The electronic device connection apparatus of claim 1, further comprising:
   a storage device including at least one memory storage device containing computer executable code storing instructions for performing each operation mode of the plurality of operation modes.

3. The electronic device connection apparatus of claim 2, wherein the controller is further configured to perform an initial operation mode chosen from the plurality of operation modes stored in the memory of the storage device.

4. The electronic device connection apparatus of claim 3, wherein the controller is further configured to change between the plurality of operation modes according to a preset order depending on the mode change signal.

5. The electronic device connection apparatus of claim 4, wherein the controller is configured to:
   determine a most frequent operation mode based on historical usage of the input device, and
   establish and write a first preset of the preset order to the storage device based on the most frequent operation mode.

6. The electronic device connection apparatus of claim 1, wherein:
   the plurality of operation modes further comprises: a standard downstream port (SDP) mode, a dedicated charging port (DCP) mode, and a charging downstream port (CDP) mode, and
   the controller is further configured to optionally select at least one of the SDP mode, the DCP mode, and the CDP mode.

7. The electronic device connection apparatus of claim 6, wherein, when the controller is in the DCP mode, the controller is further configured to choose between a normal charging mode or a fast charging mode in response to the mode change signal.

8. The electronic device connection apparatus of claim 6, wherein:
   the plurality of operation modes further comprises a sound source data transmission mode and an image data transmission mode, and the controller is further configured to automatically select a sound source data transmission mode or an image data transmission mode in response to receiving a CDP mode signal.

9. The electronic device connection apparatus of claim 8, wherein the controller is further configured to: send a display signal to a display device indicating an operation mode change between the sound source data transmission mode and/or the image data transmission mode has occurred.

10. The electronic device connection apparatus of claim 6, further comprising:
   an indicator configured to display an operation state of the operation mode, the operation state being chosen from the plurality of operation modes.

11. The electronic device connection apparatus of claim 10, wherein the indicator further includes:
   a first indicator configured to display an operation state according to the CDP mode; and
   a second indicator configured to display an operation state according to the DCP mode.

12. The electronic device connection apparatus of claim 1, wherein the input device comprises a push button configured to generate the mode change signal based on a pressing operation of the push button performed by the user.

13. A method of controlling an electronic device connection apparatus, the method comprising:
   reading an operation mode;
   determining a charging mode or a data transmission mode of an electronic device connected to a connector in response to the operation mode; and
   changing the operation mode of the electronic device in response to a user input from an input device.

14. The method of claim 13, wherein the reading the operation mode includes reading, by a controller, the operation mode from computer executable instructions that are written to a storage device, wherein the operation mode is read according to a booting.

15. The method of claim 13, wherein the changing of the operation mode includes:
   generating a mode change signal in response to the user input; and
   changing the operation mode according to a preset order in response to the mode change signal.

16. The method of claim 15, wherein the changing of the operation mode further includes:
   writing a first operation mode of the preset order in a storage device in response to the operation mode being changed to the first operation mode.

17. The method of claim 16, wherein the changing of the operation mode includes:
   selecting one of a standard downstream port (SDP) mode, a dedicated charging port (DCP) mode, and a charging downstream port (CDP) mode.

18. The method of claim 17, wherein the changing of the operation mode includes:
   performing a mode switching between a normal charging mode or a fast charging mode in response to receiving a mode change signal to be in the DCP mode.

19. The method of claim 17, wherein the changing of the operation mode includes:
   performing a mode switching between a sound source data transmission mode or an image data transmission mode in response to receiving a mode change signal to be in the CDP mode.

20. The method of claim 19, wherein the changing of the operation mode further includes:
   displaying an operation mode depending on the mode switching signal between the sound source data transmission mode or the image data transmission mode.

* * * * *